US005111288A

United States Patent [19]

Blackshear

[11] Patent Number: 5,111,288

[45] Date of Patent: May 5, 1992

[54] SURVEILLANCE CAMERA SYSTEM

[75] Inventor: David M. Blackshear, Molena, Ga.

[73] Assignee: Diamond Electronics, Inc., Carroll, Ohio

[21] Appl. No.: 772,601

[22] Filed: Oct. 8, 1991

Related U.S. Application Data

[60] Continuation of Ser. No. 556,903, Jul. 23, 1990, which is a division of Ser. No. 391,173, Aug. 9, 1989, Pat. No. 4,945,367, which is a continuation-in-part of Ser. No. 163,257, Mar. 2, 1988, Pat. No. 4,918,473.

[51] Int. Cl.[5] .............. H04N 7/18

[52] U.S. Cl. .............. 358/108; 358/229

[58] Field of Search .............. 358/108, 209, 210, 229, 358/93, 125, 126; 354/81; 403/348, 349

[56] References Cited

U.S. PATENT DOCUMENTS 4,320,949 3/1982 Pagano .............. 358/108
4,337,482 6/1982 Coutta .............. 358/210
4,763,778 8/1988 Feddersen et al. .............. 403/348

*Primary Examiner*—Victor R. Kostak
*Attorney, Agent, or Firm*—Biebel & French

[57] ABSTRACT

A surveillance camera system comprises a spherical housing that has a partially transparent lower, hemispherically shaped gold coated dome with a geometric center. A camera mount is mounted in the housing for panning movements about a vertical pan axis and tilting movement about a horizontal tilt axis. A video camera is mounted to the camera mount and electric motors are mounted for panning and tilting the mount and camera. A computer and control circuit is mounted to the camera mount and coupled to actuate the electric motors to orient the camera and to actuate the camera zoom and focus as well as to enhance the camera's video image with descriptive word captions. The computer is programmed for automatic or manual operation of the system. A rotary electric connector is mounted to the housing and connects the on board computer with a joystick and control unit for issuing instructions to the computer and connects the camera to an ancillary video display.

9 Claims, 6 Drawing Sheets

DEFINING SURVEILLANCE AREA "WINDOWS"

SURVEILLANCE CAMERA SYSTEM

REFERENCE TO RELATED APPLICATION

This application is a continuation of co-pending application Ser. No. 07/556,903, filed July 23, 1990, which is a divisional of application Ser. No. 07/391,173, filed Aug. 9, 1989, now U.S. Pat. No. 4,945,367, which is a continuation-in-part of U.S. patent application Ser. No. 163,257, filed Mar. 2, 1988, now U.S. Pat. No. 4,918,473.

TECHNICAL FIELD

The present invention relates to domed surveillance camera systems of the type that have encapsulated cameras mounted hidden from view and orientationally controllable by operators from remote locations through a computerized control system mounted with the camera.

BACKGROUND OF THE INVENTION

Today, remote controlled surveillance camera systems are commonly employed as a security measure. The cameras are normally used to generate a video image of an area under surveillance that is displayed to and/or recorded for use by security personnel. In some cases, cameras are mounted to a wall or to a ceiling structure where they may be observed by people within the area under surveillance. In other cases the cameras are hidden from view as by being placed behind one-way mirror domes or the like to avoid creating an objectionable presence to an honest person and to make it difficult for or to worry creating an objectionable presence to an honest person and to make it difficult for or to worry potential wrongdoers by making it impossible for them to locate the cameras and to see where they are directed.

Surveillance camera systems of the types just described have had several problems and limitations associated with their use. For example, where the cameras have been located within domes that move in unison with cameras, they have not been successfully used outdoors due to adherence to, and accumulation of, snow and ice which tends to freeze the moving parts. In addition, moving domes have been virtually impossible to seal against entry into the dome of airborne particulates and insects which tend to contaminate the camera and its associated electronics. Moisture condensation within the dome can also be a problem with such systems. Even indoors, movements of the dome may be visually detected which is undesirable for discreet surveillance.

Maintenance of cameras in domes and other enclosures has been difficult and time consuming as the camera mount mechanism commonly is firmly secured within the dome and the associated control electronics, usually comprising a receiver box for receiving orientation control signals from a remote location and translating same into pan/tilt/zoom camera functions, often has been remotely located, such as above a suspended ceiling.

Surveillance cameras of the prior art also have operated in operator selectable automatic pan modes in order to provide full, continuous coverage of areas of surveillance. Generally, such cameras have been of the continuous scan type which pan or oscillate through an arc continuously at a fixed speed until stopped by an operator. Some such cameras have been incapable of full 360 degree movement and instead are mounted to actuate limit switches that border ends of arcuate paths of camera travel which reverse the direction of camera panning movement. Such continuous panning results in a constantly moving image on a video monitor which can have a hypnotizing effect on guards or other persons responsible for watching such monitors. Many activities within the camera field-of-view can thus go undetected.

Where manual controls of such cameras have been provided, the cameras have tended not to produce smooth, continuous images when operated at pan and tilt rates above about 10 degrees per second. This is because abrupt, manually controlled movements have tended to cause the cameras to wobble and vibrate, particularly where the cameras are brought to a halt as when a security guard identifies an area of interest and wishes to direct the camera in that direction for a period of time. For this reason, most camera movement control systems have been limited to pan and tilt rates of about 12 degrees or less per second. This limitation in camera movement rate can render prior art systems unsatisfactory in many situations such as when a guard is alerted to an unauthorized entry and wishes to direct the camera toward the entrance. By the time (usually several seconds) that the camera is able to pan and point in the direction of the entry, the intruder usually has moved away and thus entered undetected. A more desirable rate would correspond to an average turning rate of a human head (about 90 degrees per second) in order to detect and track fleeting events or targets.

Another problem with prior art systems that pan at fixed speeds has been their inability to track smoothly objects of varying speed or objects moving obliquely relative to the camera's optical axis. In these situations, it has been necessary to jog the cameras pan and tilt positions intermittently to point the camera just ahead of the moving object allowing the object to move through the camera's field of view prior to another such anticipatory jog.

It thus is seen that a need exists for a surveillance camera system that can be centrally located indoors and outdoors, and which is capable of continuous 360 degree panning movement for scanning a surveillance area, and which has panning and tilting rates much higher than those to which prior art systems have been limited. Such a system would further be capable of easily controllable variable pan and tilt rates for tracking variable speed or obliquely moving objects. Also, it would be desirable for the camera to be programmable to move automatically and quickly from one fixed scene to another and to be manually controllable if desired in a smooth manner at high rates without the camera jerking, wobbling and producing unsteady images during accelerations and decelerations.

It would be desirable to render the camera hidden from view without sacrifice in video quality of images produced by the camera or restricting the cameras pan and tilt movement ranges. Further, it would be desirable to provide such a camera in a compact, stationery dome type housing, with the dome having an aesthetically pleasing configuration, and with the camera and its associated control electronics being readily accessible and easily removable as a unit from its housing for maintenance. Finally, such a camera system preferably would include a programmable computer and control circuit mounted with the camera for operating the camera system in various preprogrammed modes for automatic surveillance.

It is to the provision of such a surveillance camera system, therefore, that the present invention is primarily directed.

SUMMARY OF THE INVENTION

A surveillance camera system comprises a generally spherical partially transparent dome housing that includes a stationary mounting plate supported in the upper portion thereof. A camera mount is adapted to support a video camera for panning movements about a pan axis and tilting movements about a tilt axis that transverses the pan axis. The camera mount includes a connector plate that is configured along with the housing mounting plate to define a quick release bayonet-type connector system for quickly and releasably mounting the camera mount to the mounting plate within the housing.

A video camera is mounted on the camera mount and electric motor means are configured to pan and tilt the mount and camera. A computerized electronic control circuit is supported on the camera mount and is operatively coupled to control the electric motor means to orient the camera and to control the camera's zoom, focus and iris settings in response to preprogrammed or manual commands. Rotary electric coupling means such as a slip ring assembly or the like including electric connector means are provided for connecting the camera and computer with an ancillary video display and for connecting the computer and control circuit to a remote control means for issuing instructions to the computer which, in turn, controls camera movement, focus, zoom and iris in response to the instructions. The rotary coupling means allows continuous 360 degree panning movement of the camera and mount.

DETAILED DESCRIPTION

Figure 1:
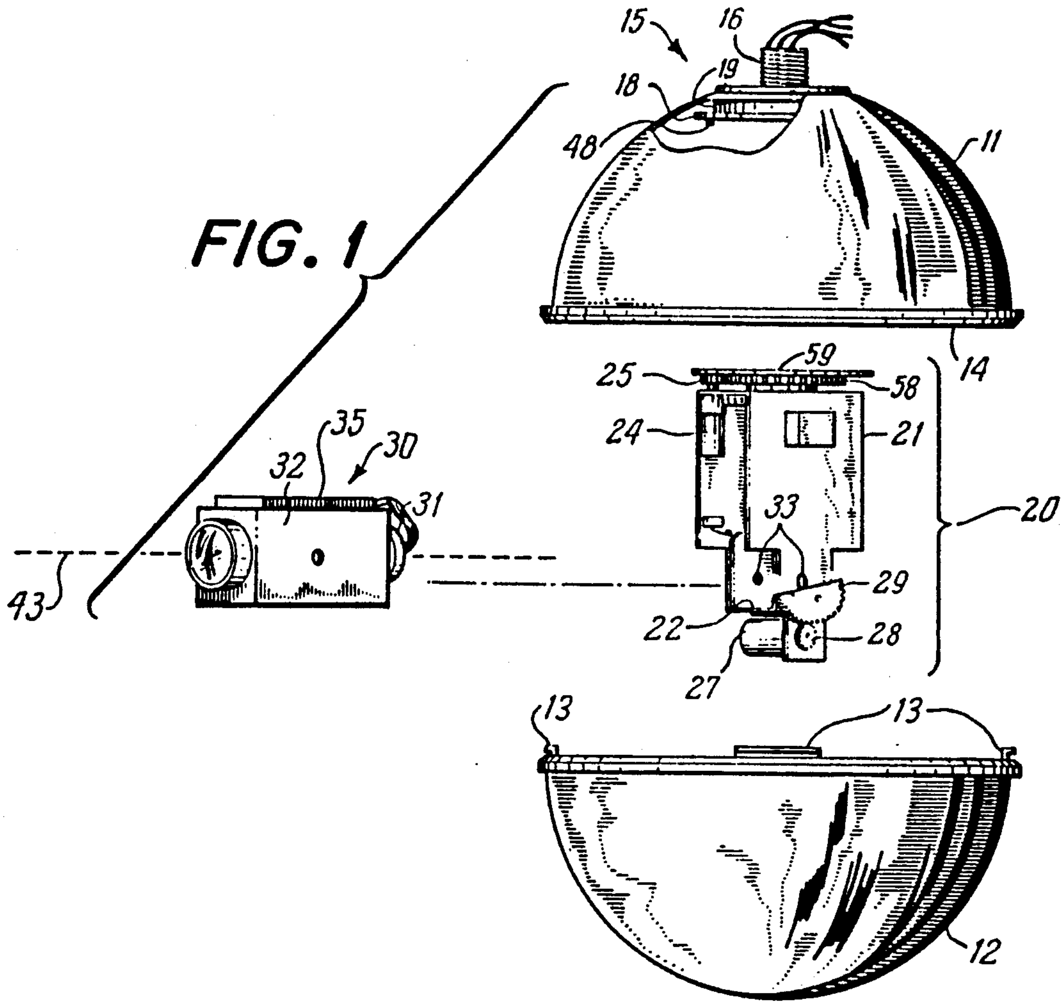
FIG. 1 is an exploded, side elevational view of a surveillance camera system embodying principles of the invention in a preferred form.

With reference next to the drawings, in which like numerals represent like parts throughout the several views, a domed surveillance camera system is illustrated which includes a generally spherical camera housing provided by an upper hemispherical dome 11 and a lower hemispherical dome 12. The lower dome 12 is formed of a clear plastic substrate the interior of which is vacuum metalized with a thin layer of gold or similar reflective material sufficient to transmit into the housing approximately 32% of the light incident of the dome with approximately 68% of the light being reflected. The upper dome 11 is also metalized and is further coated on its inside with black paint to render it opaque. The result is a spherical housing with a one-way mirrored lower portion through which a video camera within the housing can survey surrounding areas while being undetectable from outside the housing. The lower dome 12 is releasably fastened to the upper dome 11 by means of a set of four interlocking tabs 13 that may be rotary positioned onto mating supports about the lower rim 14 of the upper dome.

The upper dome 11 includes a combination hanging and mounting structure 15 which has a central body portion 19 integrally cast with the upper dome from which a threaded tubular neck 16 upwardly extends. Secured to the bottom of the central body portion 19 is a disk shaped metal mounting plate 18 from which depends a set of spring loaded quick disconnect pins 48 for releasably securing the camera mount 20 within the housing as described more fully below.

The surveillance camera system further includes a camera mount indicated generally at 20 which is releasably mountable to the mounting plate 18 within the upper dome 11. The camera mount comprises an inverted U-shaped fork 21 which tiltably supports a U-shaped camera receiving platform or saddle 22 adapted to pivot about a line extending through its points of attachment 33. The fork 21 is rotatably suspended from a disk shaped sun gear 58 to the top of which is affixed a larger disk shaped mounting plate 59. The plate 59 includes slots 64 (FIG. 5) positioned and configured to align and lockingly engage with the depending spring loaded pins 48 of the plate 18 upon juxtaposition and rotation of the mounting plates 59 and 18 as detailed below.

An electric motor 24 is mounted to the ceiling of the fork 21 and has a planetary gear 25 secured to its drive shaft and placed in mesh with the sun gear 58. Another electric motor 27 is mounted to the saddle 22 and has a planetary gear 28 in mesh with a half sun gear 29 that is rigidly secured to the fork 21. With this configuration, operation of the electric motor 24 causes the mount 20 to rotate about a vertical pan axis that extends through the center of the spherical housing and along the axis of the threaded neck 16 when the camera mount 21 is mounted within the housing. Operation of the other motor 27 causes the platform 22 to pivot or tilt about a horizontal axis that transverses both the pan axis and the optical axis of a camera mounted on the platform 22. The intersection of these axes is preferably located just beneath the center of the spherical housing when the camera mount is mounted within the housing for unobstructed view through the lower transparent dome at horizontal tilt orientations of the camera.

The surveillance camera system further includes a video camera 30 such as model DE-3112 CCD camera sold by Diamond Electronics, Inc. The camera 30 includes a lens assembly 32 having controllable lens zoom, focus and iris functions. A CCD video sensor 31 is mounted to the rear of the lens assembly 32 at its focal plane and a camera electronics package 35 for converting sensed images to video signals is mounted to the top of the lens assembly 32. The lens assembly 32 has an optical axis 43 and is mounted upon the platform 22 with its optical axis 43 intersecting the pan axis and transversing tilt axis of the camera mount. In this way, the camera optical axis remains normal to the surface of the lower dome 12 in all possible pan and tilt orientations of the camera. Further, the center of gravity of the camera 30 and lens assembly 32 is preferably coincident with the intersection of the pan and tilt axis such that the camera and lens assembly is kinematically balanced for rapid pan and tilt movement rates.

Figure 3:
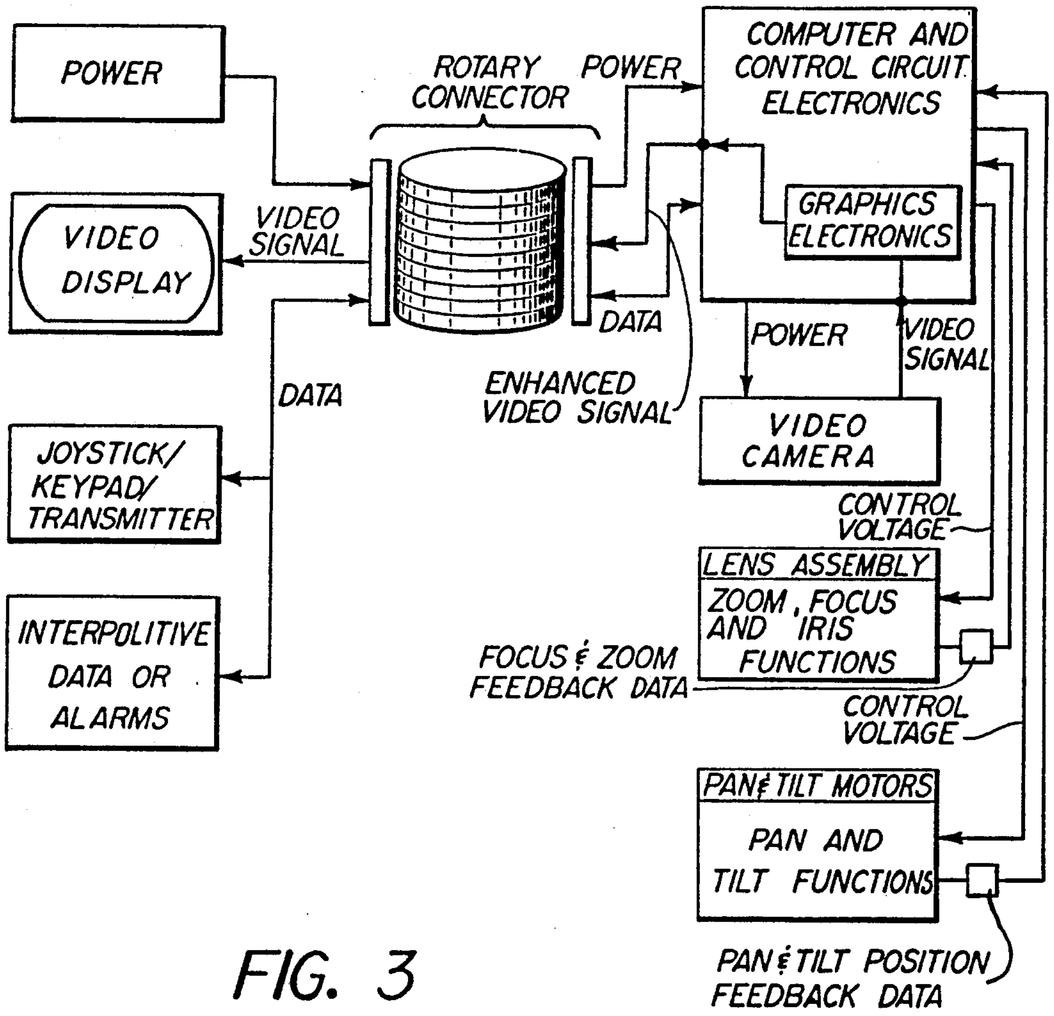
FIG. 3 is a functional block diagram of the interconnections of components of the system through the slip ring rotary connector.

The video camera 30 is conventionally provided with power terminals for connecting the camera with electrical power and with video output terminals for outputting the camera's video signals. As illustrated in FIG. 3, the video camera is connected through the computer and control circuit 61 and, in turn, through the rotary connector 39 to a source of electrical power. The video output signal of the camera passes through a graphics electronics portion of the computer and control circuit 61 which may enhance the video signal by adding descriptive word captions to the video image as detailed below prior to passing the video signal on to a video display through the rotary connector.

The computer and control circuit 61 is mounted to and movable with the camera mount and is operatively coupled to the pan and tilt motors 24 and 27 to control pan and tilt functions of the camera and also operatively coupled to the zoom, focus, and iris controls of the camera lens assembly for control of lens functions. In this way, the pan, tilt, zoom, focus and iris functions of the system are all directly controllable by the on board computer and control circuit 61.

Figure 2:
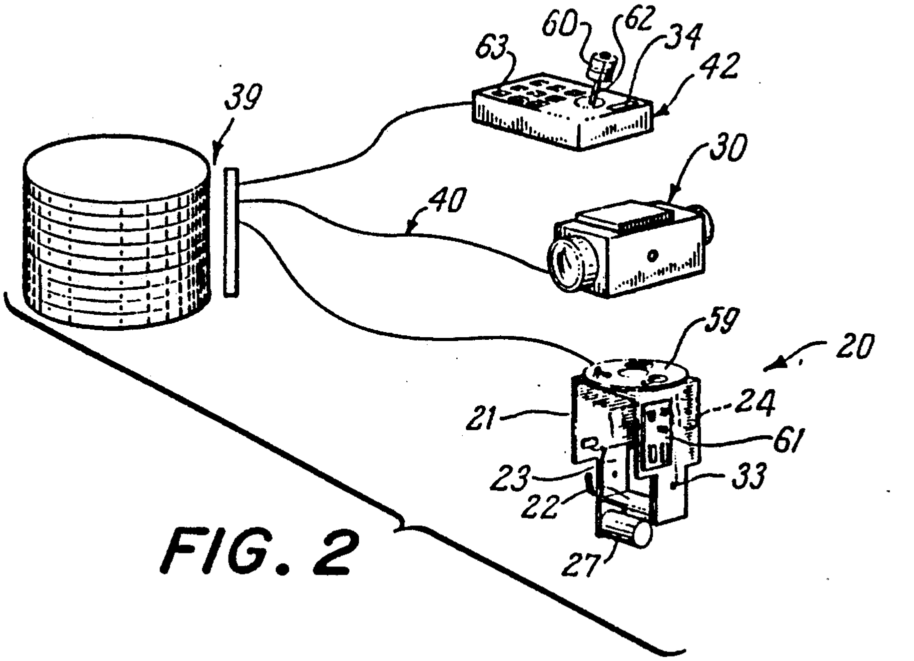
FIG. 2 is a diagrammatical view of the electrical connections of components of the surveillance camera system illustrated in FIG. 1.

As illustrated in FIG. 3, the computer and control circuit 61 is electrically connected through the rotary connector 39 for exchange of data with a hand held joystick keyboard transmitter controller 42. The controller 42 includes a conventional joystick 62 (FIG. 2) capable of omnidirectional X-Y axis movement. The joystick 62 has a rotatable knob-like upper portion 60 mounted to actuate internal potentiometers whose resistance is indicative of the rotary position of the knob. In the preferred embodiment, when the system is operated in its manual mode, the camera's pan and tilt movement are controlled by X-Y movement of the joystick knob 60 while zoom functions of the lens assembly are controlled by rotary movement of the knob-like upper portion of the joystick. Focus and iris functions are manually controlled by switches mounted on the controller 42. Further, pan and tilt movement rates of the camera are proportional to the magnitude of X-Y movement of the joystick. In this way, the camera can be moved slowly to track slow moving objects, quickly to move to a desired scene or variably to track variable speed objects such as persons moving obliquely relative to the camera's optical axis.

A visual display 34 (FIG. 2) is also included on the controller/transmitter 42 for displaying status and prompt messages to a user of the surveillance system. The keypad 63 can be used to key in instructions and directions to the on-board computer control circuit 61 which is programmed to respond to the instructions to control the surveillance system in a desired way. In a preferred embodiment, data is processed by both the controller/transmitter 42 and the on board computer and exchanged through a serial data interface. Data can also be transmitted to the computer from alarmed events such as the opening of a door or from other means such as interpolative data from a point of sale cash register interface, to control camera functions in response thereto.

The computer is preferably preprogrammed for various automatic operation modes such as, for example, automatic target vectoring, wherein the camera is moved by the on-board computer in a predetermined order and at predetermined speeds to a series of preset pan, tilt, zoom and focus settings at which the camera dwells for predetermined dwell times. The operator can instruct the computer to execute a file corresponding to one of its automatic operation sequences by issuing a corresponding instruction through the keypad 63. Optionally, the computer can be instructed through the keypad 63 to receive X-Y axis orientation signals as well as zoom and focus signals from the joystick and to orient the camera accordingly. In this way, the pan, tilt, zoom and focus of the camera system can be operated manually if desired through appropriate manipulations of the joystick.

Figure 4:
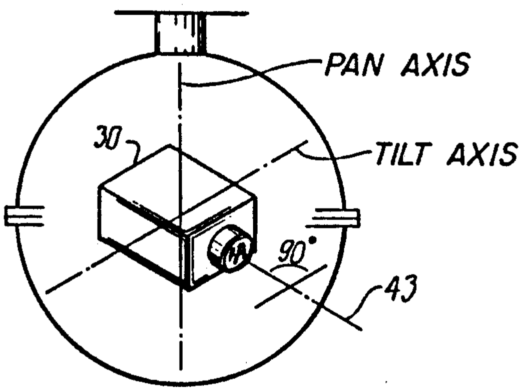
FIG. 4 is a diagrammatical view showing camera orientation within the housing.

As shown in FIG. 4, the center of gravity of the camera 30 is located on or very close to the intersection of the vertical pan axis and horizontal tilt axis. These axes are also located so as to intersect at or close to the center of the spherical housing when the camera and camera mount are secured therein. With this configuration, the housing diameter required to accommodate the full range of movement of the camera and mount is minimized such that the smallest possible dome can be used. Further, with this configuration, the camera's optical axis 43 is always oriented substantially normal to the surface of the dome 12 regardless of the camera's orientation with respect to the pan and tilt axes. This serves to minimize some generated image refractions which tend to impede optical quality of the image transmitted to the camera.

For operation, the upper dome may be suspended from a room ceiling or pendant mount via the threaded neck 16, the camera mount 20 attached, and electrical connections established through the rotary connector 39 (FIG. 5) via pin connector 73. The camera may then be operated so as to scan an area under surveillance located beneath and about it. As this is done the camera is hidden from view since only a reflective ball-like object, or dome in a false ceiling version, is viewable by people in the surveillance area.

Should an operator, such as a security guard, see an activity of possible interest to him on his video monitor screen, he may place the system in its manual mode and orient the camera by operation of the joystick and then zoom into the area of interest for magnified viewing. In doing so, the displacement of the stick from its zero point is proportional to the speed of camera movement as discussed above.

With the center of gravity of the camera located closely adjacent the intersection of the pan and tilt axes, high speed camera movements can be made and the camera brought to rather abrupt halts quite smoothly with imperceivable wobbling actions developed by camera and camera mount momentum. Thus, the CCD camera, with its unique modular configuration and mounting, is kinematically balanced with movement rates of at least 75 degrees per second achieved.

The central location of the camera within a spherically or at least a hemispherically-shaped housing dome also provides for a compact unit. The semi-transparent, unidirectional coating of the dome, in combination with the normal directing of the camera optical axis onto the lower dome in all camera orientations, further provides for high quality, low distortion video imaging by the camera while it remains hidden form view from ambience within a stationery housing. The unique multiple-use of the rotary electrical connector and the on-board mounting configuration of the computer and control circuit, in combination with the quick disconnect provided by the specially configured mounting plates, provides for continuous, panning in either direction and enables the camera system to be removed quickly and easily.

Figure 5:
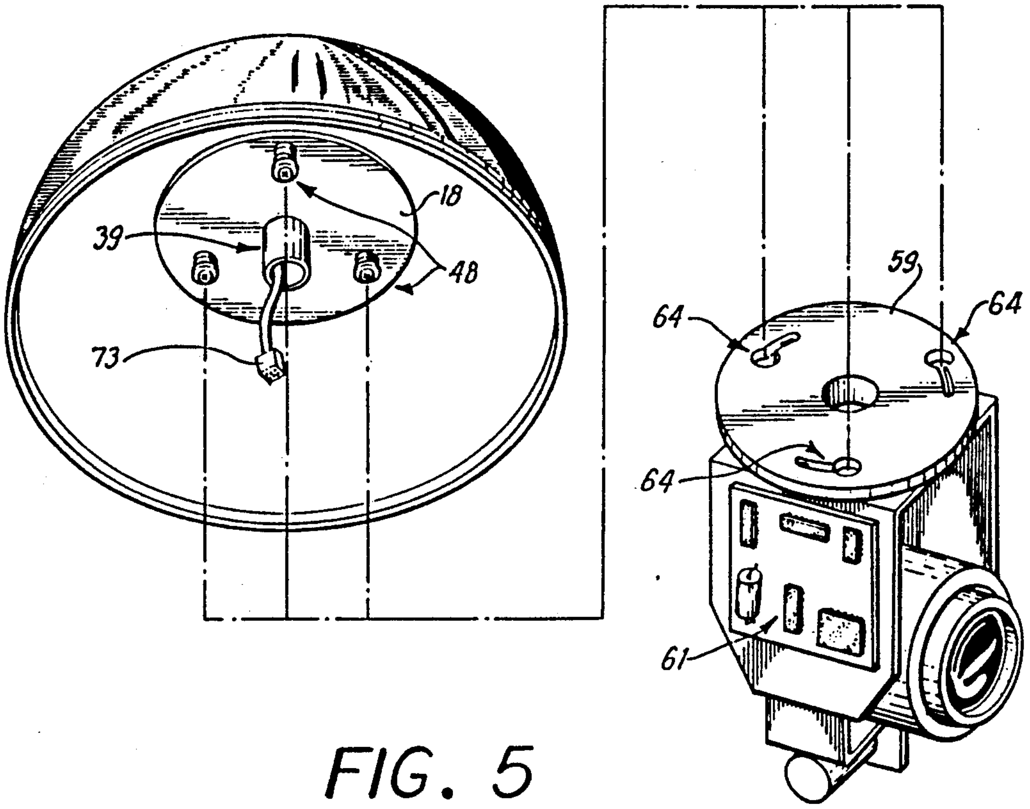
FIG. 5 is an exploded view of the camera mount and upper housing illustrating the quick disconnect bayonet mount.
Figure 6:
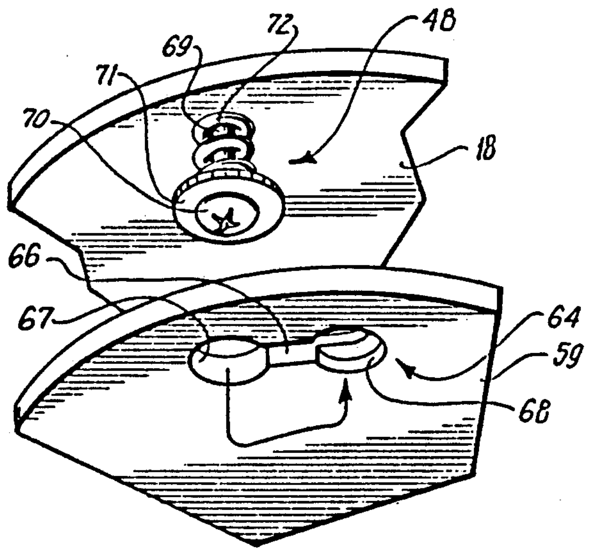
FIG. 6 is an enlarged view of a portion of the quick disconnect mount showing the spring loaded connecting pin and corresponding slot.

Referring in particular to FIGS. 5 and 6, which illustrate the quick disconnect feature, the housing 11 is seen to have a mounting plate 18 from which depends a set of pins 48 arranged in a circular array. Each pin 48 has a shank 69 fixed at one end to the plate 18 and a head 70 formed on the distal end of the shank 69. A washer 71 is mounted about the shank 69 and is yieldably spring biased toward engagement with the head 70 by a compression spring 72.

The lower mounting plate 59 of the camera mount has formed therein a set of generally arcuate slots 64 that are positioned to align with the pins 48 upon juxtaposition of the mounting plates 18 and 59. Each slot has a central portion 66 having a width greater than the diameter of a pin shank and less than the diameter of a corresponding pin head. A circular opening 67 is formed at one end of the slot 64 and is sized to pass the pin head 70 therethrough. A circular depression 68 is formed in the mounting plate 59 at the other end of the slot 64 and is sized to receive the pin head in locking nestled relationship.

The just described configuration forms a spring loaded bayonet-type mount which permits quick and easy mounting and dismounting of the camera mount, camera, lens and electronics as a unit for replacement or repair. In particular, to install the camera mount within the housing, the mount is moved upwardly into the housing with the mounting plates 18 and 59 approaching juxtaposition and with the pin heads 70 aligned with the openings 67. As the mounting plates move toward engagement, the pin heads 70 move through the openings 67 while the washers 71 engage and bear against the upper surface of the plate 59 causing the springs 72 to compress.

When the pin head has cleared the opening 67, the camera mount and plate 59 are simply rotated to move the pin shank 69 through the central portion of the slot and to the distal end thereof. At this location, the force applied to the mounting plate 59 by the springs 72 and washers 71 and the force of gravity urge the plate 59 downwardly such that the pin head 70 drops into and nestles within the depression 68. The plates 59 and 18 are thus securely locked together. The camera mount is easily removed from the housing by applying upward force to the mount to dislodge the pin heads from the depressions and rotating the mount in the opposite direction until the pin head can pass back through the opening 67. It can be seen that this configuration forms a convenient quick release mount. In the event that the unit should require service, the defective camera, mount and computer control circuit are all removed together by disconnection of the bayonet mount. A replacement unit can then be installed all within a very short time such that virtually no down time results from required repair of a defective unit.

Figure 7:
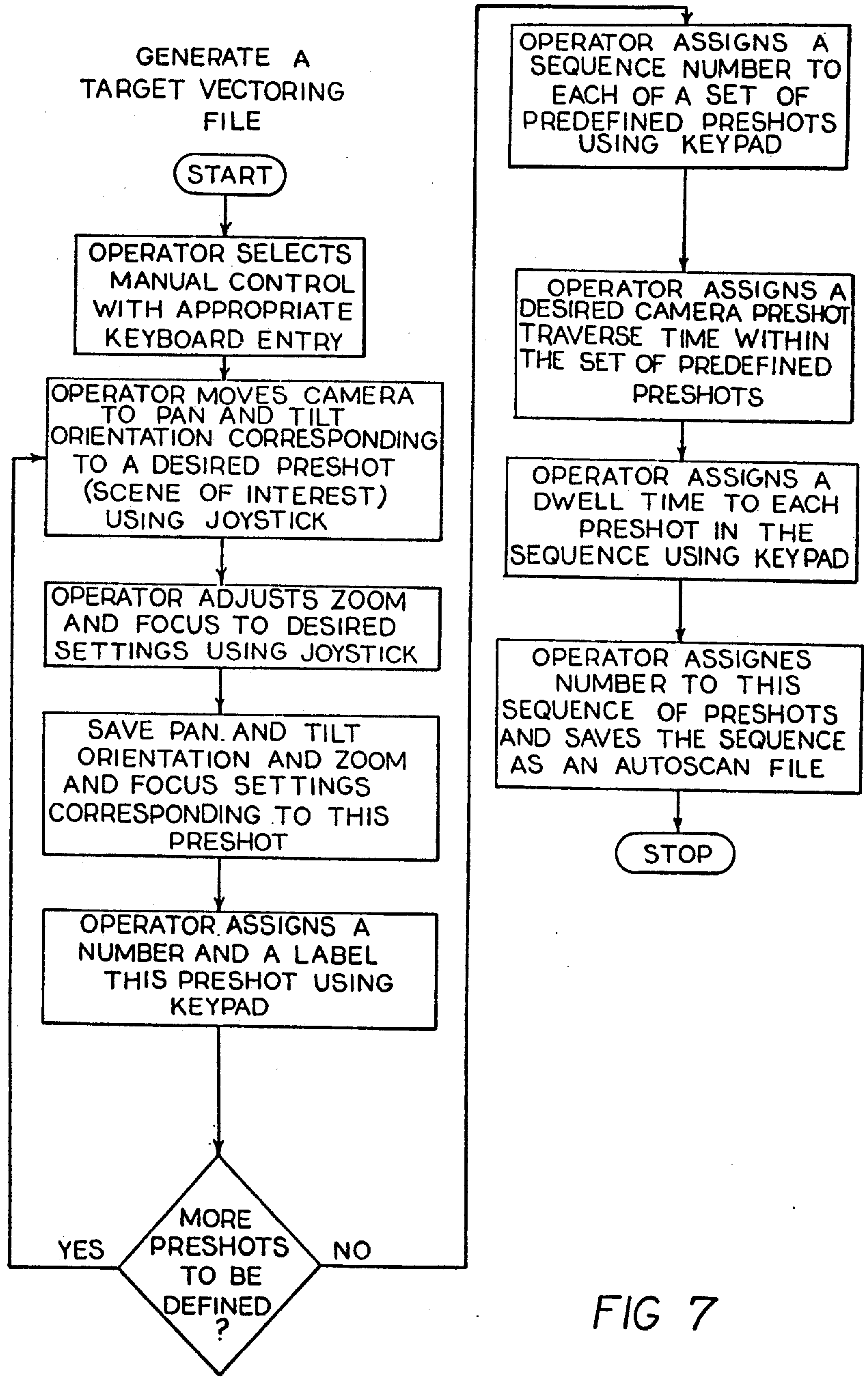
FIG. 7 is a functional flow chart illustrating a preferred programmed method of generating an automatic target vectoring file.
Figure 8:
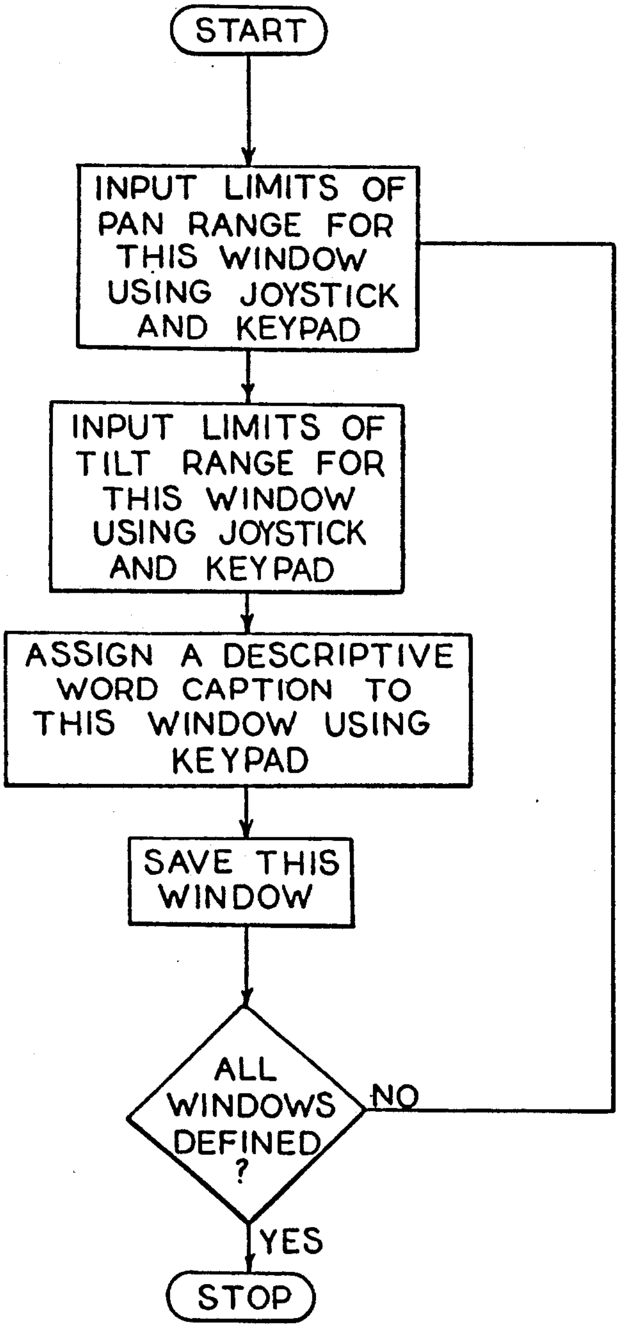
FIG. 8 is a functional flow chart illustrating a preferred programmed method of defining and assigning captions to surveillance area windows.
Figure 9:
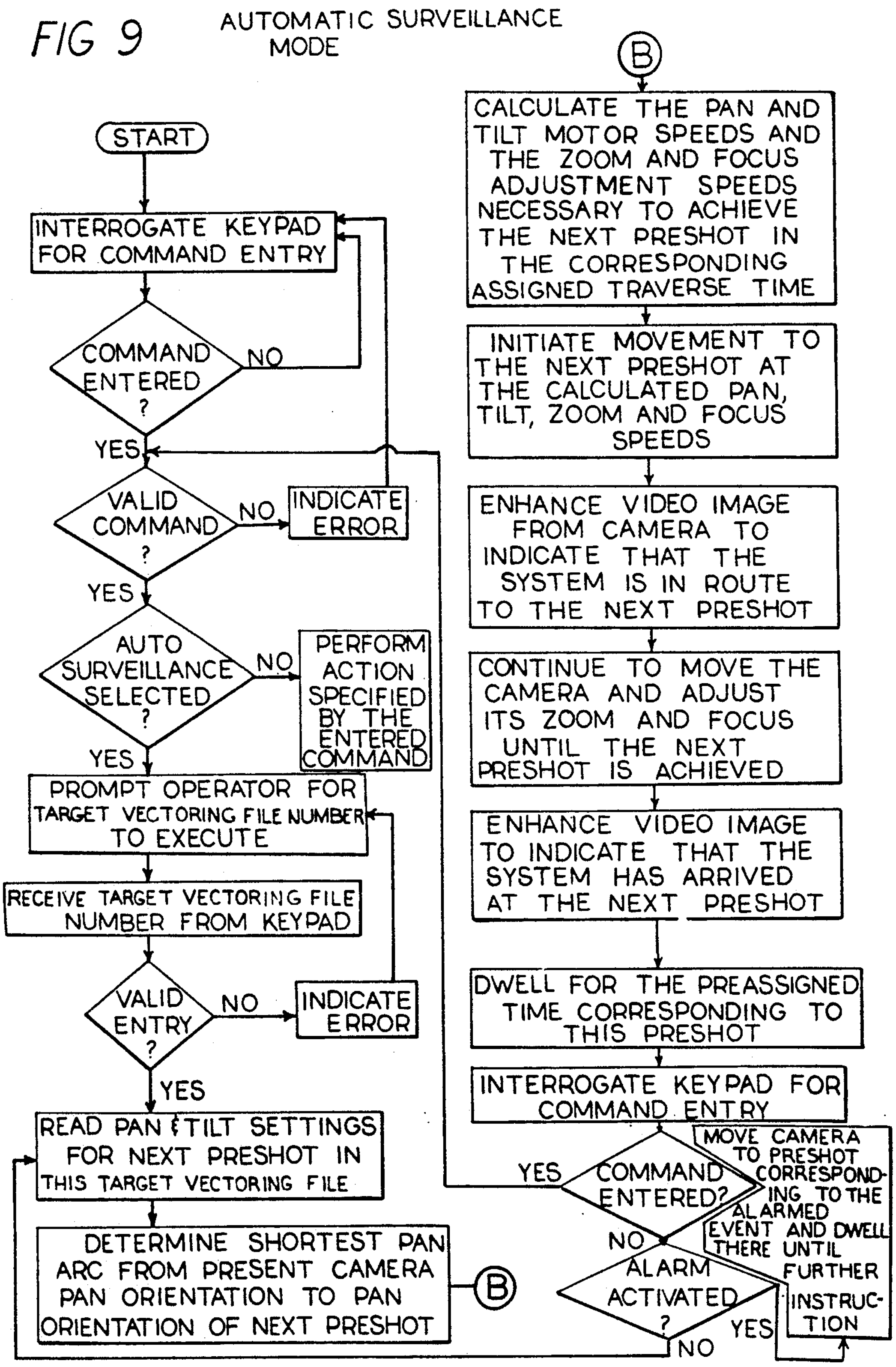
FIG. 9 is a functional flow chart illustrating a preferred programmed method of operation of the system in its automatic surveillance mode.

FIGS. 7 through 9 illustrate methods that can be programmed into the computer and control circuit for controlling the surveillance camera system in a preferred way, particularly for automated surveillance. FIG. 7 illustrates such a method of defining to the computer a set of camera pan and tilt orientations, zoom and focus settings to which the camera can be moved by the computer in a predetermined sequence and speed for automated surveillance. The set of camera settings thus defined is called an automatic target vectoring file and several such files can be defined and saved within the computer depending on available memory. According to the functional flow chart illustrated in FIG. 7, when it is desired to define and save a target vectoring file, an operator first instructs the on-board computer to place the system in its manual control mode wherein camera orientation, zoom and focus are controlled through appropriate manipulations of the joystick 62. The camera is then directed manually to a scene of interest such as, for example, the jewelry counter of a department store in which the surveillance camera system may be installed. The operator then adjusts the camera zoom and focus until the desired scene is displayed on the video monitor and instructs the on-board computer, through appropriate keypad entries, to save the camera orientation and settings as a "preshot" and an identifying number or label is assigned through keypad entries to the preshot for future reference. Further, a descriptive word caption as well as a desired traverse time from the previous preshot to this preshot is assigned to the preshot and stored for later use. This procedure is repeated until all desired preshots have been defined and saved. A group of preshots is then identified with a sequence number with a dwell time being assigned to each preshot of the group. The group as a whole is then saved within the computer as a target vectoring file. This procedure can be repeated as necessary to define and save additional target vectoring files for future access and execution as described in detail below.

The desired traverse time assigned to each preshot is used by the on-board computer to calculate the speed at which the pan and tilt motors should be operated and the zoom and focus adjusted in order for the camera to reach the corresponding preshot from the previous preshot in the assigned traverse time. This can be used to produce valuable surveillance transitions between preshots. One preshot, for example, might be chosen to orient the camera at one end of an isle while the subsequent preshot chosen to orient the camera at the other end. The traverse time corresponding to the second preshot can then be chosen to move the camera slowly along the isle from the first to the second preshot so that the operator can survey the isle during preshot transition.

FIG. 8 illustrates a preferred programmed method of defining within the surveillance area a number of pan and tilt position "windows" to which descriptive word captions can be assigned and presented as an enhancement of the image displayed on the video monitor when the camera is directed within the window. A window bordering the jewelry department, for example, might be defined and assigned the caption "JEWELRY DEPARTMENT" while a window bordering the sportswear department might be assigned the caption "SPORTSWEAR DEPARTMENT", the appropriate caption being displayed along with the video image when the camera is pointing within the corresponding department. It can be seen that this method is useful to an operator, especially one unfamiliar with the numerous scenes being displayed and constantly changing in a multiple camera system, allowing instant "on-the-fly" identification of and familiarity with said scenes under surveillance.

As illustrated in FIG. 8, an operator, using the joystick and keypad, inputs to the computer the pan limits and the tilt limits of a portion of the surveillance area with these limits intersecting to define the generally rectangular window therein. Preferably, the limits will correspond to the boundaries of a particular scene such as a particular department within a store. While such limits can be entered in various ways, it is preferred that the on-board computer and control circuit be instructed to display pan and tilt positions corresponding to azimuth and elevation coordinates in degrees on the video monitor whereupon the camera can be moved through manipulation of the joystick to each of the window boundaries and the pan and tilt angles corresponding thereto noted and entered by the operator. Once a window has been so defined, it is assigned a corresponding descriptive word caption and saved with its caption in the computer. Other windows can be defined, captioned and saved in this same manner for use as described below.

FIG. 9 illustrates a preferred method of computer controlled operation of the surveillance camera system in its automatic surveillance mode wherein the camera is moved by the on-board computer and control circuit sequentially to each preshot in a predefined target vectoring file. The method is, of course, performed by a computer program within the on-board computer that actuates the pan and tilt control motors 24 and 27 and the camera zoom and focus adjustments through the electronic control circuit as illustrated in FIG. 3. The program first interrogates the keypad to determine if a valid command has been entered. If so, the command is analyzed and the selected function performed. If the command indicates that the operator wishes the system to enter its automatic surveillance mode, the operator is prompted by the computer through a query appearing selectively on the video monitor in the form of a transparent video message and on the alpha/numeric display 34 to enter the identifying number or label of a predefined and stored target vectoring file containing sequences of preshots. Upon such entry, the designated target vectoring file is accessed from memory by the computer and the pan/tilt positions of the first preshot within the file is read. The shortest pan arc from the present camera pan position to the pan position designated by this preshot is calculated as well as the speed at which the pan motor must be operated to achieve the pan traverse time corresponding to the preshot. The camera is moved toward such position at such speed along the calculated arc while simultaneously being moved along the tilt axis toward the designated tilt position at a corresponding calculated tilt speed. At the same time, the camera zoom and focus settings are set to those of the preshot such that the camera zoom and focus will be properly adjusted when the preshot is reached. Since the camera tilt range is between zero degrees (horizontally oriented) to 90 degrees (vertically oriented) and not the full 360 degrees of the pan range, it is unnecessary to calculate and move the camera along a shortest path to the designated tilt position.

As the camera is being moved toward its next preshot, the video image therefrom is enhanced with an informative message such as "GOING TO PRESHOT A" to indicate to the operator the current status of the system. In this way, the operator remains constantly aware of the camera's "en route" destination as it moves from one preshot to another. This movement toward the preshot and caption display is continued until the pan, tilt, zoom and focus of the camera equals that of the preshot whereupon descriptive word caption enhancement can be changed to read for example, "DOCKED AT PRESHOT A" and the system dwells for the preassigned dwell time for this preshot. If, after dwelling, no command has been entered by the operator and no alarm has been activated, the next preshot settings are read from the target vectoring file and the camera moved thereto as previously described. The camera thus continues to move from preshot to preshot in the automatic surveillance mode of the system with preshot scenes being identified with descriptive word captions until a command is entered or an alarm activated.

If a command is entered, the automatic surveillance mode is terminated and control returned to the command interrogation portion of the program as illustrated in FIG. 9. If an alarm has been activated such as by the opening of a jewelry case or door, the automatic surveillance mode is also terminated and the camera is moved at maximum velocity to its predefined pan and tilt orientation and zoom and focus settings corresponding to the alarm where it dwells until otherwise instructed by the operator through the keypad. The activation of an alarm, therefore, discontinues the auto surveillance mode and orients the camera to survey the alarmed area for monitoring thereof. Since the system is kinematically balanced, as described above, such can be done at very high pan and tilt slew rates such that the event actuating the alarm, such as an unauthorized intruder, can be detected and observed while the event is still in progress. This represents a particular advantage over prior art systems whose fixed slew rates are limited to a few degrees per second so that events are often over by the time the camera is able to slew to observe them.

The invention has been described in terms of preferred embodiments and implementations. It will be obvious to skilled artisans that many modifications might be made to these embodiments. Variations of the specific computer program steps might, for example, be possible as well as various configurations of the camera and mount configurations. These and other modifications may be possible without departing from the spirit and scope of the invention as set forth in the claims.

I claim:

1. In a surveillance camera system of the type having a video camera mounted for orientational movement about pan and tilt axes and electrically connected to a video monitor, a method of controlling the orientation of the camera for automated surveillance with said method comprising the steps of:

(a) defining and storing at least two orientations of the camera within its surveillance area with each orientation comprising a pan position and a tilt position of the camera;

(b) defining and storing a descriptive word captain corresponding to each of the camera orientations defined in step (a);

(c) selecting one of the camera orientations defined in step (a);

(d) moving the camera about the pan axis in a direction toward the pan position of the selected camera orientation;

(e) moving the camera about the tilt axis in a direction toward the tilt position of the selected camera orientation;

(f) terminating camera movement when its pan and tilt position equals those of the selected camera orientation;

(g) enhancing the video signal from the camera with the descriptive word caption corresponding to the selected camera orientation and displaying the enhanced video image on the video monitor;

(h) dwelling a predetermined length of time; and (i) go to step (c), and wherein steps (c) through (i) are performed by a computerized control means mounted with the video camera.

2. The method of claim 1, wherein step (d) further comprises calculating the shortest pan arc from the present pan position of the camera to the pan position of the selected camera orientation and wherein the camera is moved toward the selected pan position along the arc thus calculated.

3. The method of claim 1 wherein the camera is moved about the pan and tilt axes at a rate of at least 75 degrees per second.

4. The method of claim 1 further comprising the steps of defining a camera zoom and focus setting corresponding to each orientation defined in step (a) and further including the step of adjusting the camera zoom and focus to equal the zoom and focus settings corresponding to the selected camera orientation as the camera moves to the selected orientation.

5. The method of claim 1 further comprising the steps of defining and storing a camera orientation and zoom and focus settings corresponding to an alarmed event and wherein following step (h), determining if the alarm has been actuated and, if so, moving the camera to the orientation corresponding to the event while adjusting the camera zoom and focus to the settings corresponding to the event.

6. The method of claim 1 wherein the computerized control means is addressable from a remote location through remote control means and wherein steps (a) and (b) are performed by an operator through said remote control means.

7. The method of claim 1 further comprising the step of enhancing the video signal from the camera as the camera is moved to a selected orientation with a message indicative that the camera is en route to the selected orientation.

8. The method of claim 1 wherein step (b) further includes defining and storing a desired pan and tilt traverse time corresponding to each of the camera orientations defined in step (a) and where in steps (d) and (e) the camera is moved at rates that will result in pan and tilt traverse times equal to those defined in step (b).

9. In a surveillance camera system of the type having a video camera mounted for orientational movement about pan and tilt axes by manual manipulations of a control joystick and being connected to a video monitor, a method of indicating camera orientations to an operator comprising the steps of:

(a) defining and storing at least one pan range and at least one tilt range with said ranges intersecting to define an orientational window within the camera's surveillance area;

(b) assigning a descriptive word caption corresponding to the window defined in step (a);

(c) as the camera is moved within its surveillance area, comparing its pan and tilt position with the pan and tilt ranges defined in step (a); and (d) if the camera's pan and tilt position falls within the intersection of the ranges defined in step (a), enhancing the video signal from the camera with the descriptive word caption assigned in step (b).

* * * * *